(12) United States Patent
Ji

(10) Patent No.: US 12,432,271 B2
(45) Date of Patent: Sep. 30, 2025

(54) DATA ACQUISITION METHOD AND APPARATUS FOR ARTIFICIAL INTELLIGENCE PLATFORM, DEVICE AND MEDIUM

(71) Applicant: INSPUR SUZHOU INTELLIGENT TECHNOLOGY CO., LTD., Jiangsu (CN)

(72) Inventor: Guiyang Ji, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/281,749

(22) PCT Filed: Feb. 28, 2022

(86) PCT No.: PCT/CN2022/078400
§ 371 (c)(1),
(2) Date: Sep. 12, 2023

(87) PCT Pub. No.: WO2023/040203
PCT Pub. Date: Mar. 23, 2023

(65) Prior Publication Data
US 2024/0314202 A1    Sep. 19, 2024

(30) Foreign Application Priority Data
Sep. 18, 2021 (CN) .......................... 202111096227.7

(51) Int. Cl.
*H04L 67/1097* (2022.01)
*G06F 16/182* (2019.01)

(52) U.S. Cl.
CPC ........ *H04L 67/1097* (2013.01); *G06F 16/183* (2019.01)

(58) Field of Classification Search
CPC .......................... H04L 67/1097; G06F 16/183
(Continued)

(56) References Cited

U.S. PATENT DOCUMENTS

2017/0373955 A1 * 12/2017 Kocoloski ............. G06F 9/4893
2020/0104174 A1 *  4/2020 Vlcek ................... G06N 3/044
(Continued)

FOREIGN PATENT DOCUMENTS

CN          107395708 A       11/2017
CN          107562385 A   *    1/2018
(Continued)

*Primary Examiner* — Wing F Chan
*Assistant Examiner* — John Fan
(74) *Attorney, Agent, or Firm* — IPro, PLLC

(57) ABSTRACT

The present application discloses a method for acquiring datum of artificial intelligence platform, device, apparatus and medium, which includes: acquiring datum operation request initiated by target node of the artificial intelligence cluster aiming at target datum; counting current datum operation burden of each of the other compute nodes; according to order of the current datum operation task burden from lower to higher, traversing all of the other compute nodes sequentially, and in the traversal process, judging whether the compute node that is currently being traversed has already stored the target datum; under the condition it has already stored the target datum, by shared storage network that is pre-constructed between the different nodes of the artificial intelligence cluster based on remote direct datum access technology, transmitting the target datum of the compute node that is currently being traversed to the target node.

18 Claims, 7 Drawing Sheets

(58) Field of Classification Search
USPC .......................................................... 709/213
See application file for complete search history.

(56) References Cited

U.S. PATENT DOCUMENTS

| | | | |
|---|---|---|---|
| 2020/0104385 A1 | 4/2020 | Zheng et al. | |
| 2020/0334092 A1* | 10/2020 | Ravitzki | G06F 11/079 |
| 2022/0344049 A1* | 10/2022 | Hall | G06F 9/5066 |

FOREIGN PATENT DOCUMENTS

| | | | | |
|---|---|---|---|---|
| CN | 107783731 A | | 3/2018 | |
| CN | 110333937 A | * | 10/2019 | ........... G06F 9/4881 |
| CN | 110764708 A | | 2/2020 | |
| CN | 112231106 A | * | 1/2021 | ........... G06F 21/604 |
| CN | 113326155 A | | 8/2021 | |
| CN | 113965587 A | | 1/2022 | |

\* cited by examiner

DATA ACQUISITION METHOD AND APPARATUS FOR ARTIFICIAL INTELLIGENCE PLATFORM, DEVICE AND MEDIUM

The present application claims the priority of the Chinese patent application filed on Sep. 18, 2021 before the Chinese Patent Office with the application number of 202111096227.7 and the title of "METHOD FOR ACQUIRING DATUM OF ARTIFICIAL INTELLIGENCE PLATFORM, DEVICE, APPARATUS AND MEDIUM", which is incorporated herein in its entirety by reference.

TECHNICAL FIELD

The present application relates to the technical field of datum acquisition and, more particularly, to a method for acquiring a datum of an artificial intelligence platform, a device, an apparatus and a medium.

BACKGROUND

At present, with the vigorous development of industries related to artificial intelligence, increasingly more researchers in scientific research enterprises and universities have increasingly higher requirements for computing power. The construction of an Artificial Intelligence (AI) cluster effectively satisfies the requirements for the calculation power of the enterprises and scientific research universities. Various types of artificial intelligence clusters are continuously emerging in the market. One important basic function of the artificial intelligence cluster is file operations, which including a series of operations, for example a local download cache of a data set, reading of a file during a training process, write-back of a training task log, and movement of a file and the like, these all depend on the storage resources of a cluster. Furthermore, large-scale artificial intelligence clusters have very high requirements for both of the storage and the network, and perform frequent Input/Output (I/O) operations. How to perform a mass quantity of file operations in the artificial intelligence cluster without affecting the performance of the artificial intelligence cluster has become a problem required to be primarily solved of the artificial intelligence cluster, which is related to the work efficiency of training tasks of users of the artificial intelligence cluster.

However, the current artificial intelligence cluster mostly uses a single node as the storage, or uses an external storage, which belong to a one-to-many storage design mode. That is, one shared storage is loaded to each of the compute nodes of the cluster. The disadvantage of such a mode is very obvious, that is, the network burden and the magnetic-disk I/O burden are all on one node, which results in a low usage efficiency of cluster resources, and results in waste of the cluster resources. With the increase of the quantity of the nodes, the burden on the master storage node is also increased, which is completely unsuitable for requirements of the rapidly growing scale of the artificial intelligence clusters. Furthermore, since a mass quantity of data set files exist in the artificial intelligence cluster, which are unimportant backup files, under the condition that the data set is placed on the master storage node, whether it is a transfer in the user directory or a cache locally stored, the resources of the artificial intelligence cluster will be wasted, so that the storage and network resources will not be sufficiently utilized.

SUMMARY

In view of the above, the purpose of the present application is to provide a method for acquiring a datum of an artificial intelligence platform, a device, an apparatus and a medium, which may reduce the network and magnetic disk burden of a master storage node of the artificial intelligence cluster, so that network resources among compute nodes are sufficiently utilized, and the utilization rate of the resources of the artificial intelligence cluster is enhanced. The solutions are as follows:

According to a first aspect, the present application discloses a method for acquiring a datum of an artificial intelligence platform, wherein the method is applied to an artificial intelligence cluster comprising a master storage node and a plurality of compute nodes, and includes:

acquiring a datum operation request initiated by a target node of the artificial intelligence cluster aiming at a target datum, wherein the target node is any one of the compute nodes of the artificial intelligence cluster;

counting a current datum operation task burden of each of the other compute nodes;

according to an order of the current datum operation task burden from lower to higher, traversing all of the other compute nodes sequentially, and in every traversal process, judging whether the compute node that is currently being traversed has already stored the target datum; and under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, according to the datum operation request, performing a corresponding operation on the target datum.

According to an embodiment of the present application, the method for acquiring a datum of an artificial intelligence platform further includes:

under the condition that none of the compute nodes that are traversed store the target datum, by means of the shared storage network that is pre-constructed between the different nodes of the artificial intelligence cluster based on the remote direct datum access technology, transmitting the target datum that is pre-stored in the master storage node to the target node, so that according to the datum operation request, by the target node, performing the corresponding operation on the target datum.

According to an embodiment of the present application, a construction process of the shared storage network includes:

based on the remote direct datum access technology and an infinite-bandwidth technique, constructing a network file system shared storage network between the different nodes of the artificial intelligence cluster, wherein the network structure of the network file system shared storage network is a fully connected structure.

According to an embodiment of the present application, the step of, counting the current datum operation task burden of each of the other compute nodes includes:

monitoring whether any of the other compute nodes malfunctions; and under the condition that any of the other compute nodes malfunctions, setting the current datum operation task burden of the compute node that malfunctions to be infinitely great.

According to an embodiment of the present application, the step of, counting the current datum operation task burden of each of the other compute nodes includes:

monitoring a current task quantity of each of the other compute nodes, to obtain the current datum operation task burden of the compute node.

According to an embodiment of the present application, in the process of, according to the order of the current datum operation task from lower to higher, traversing sequentially all of the other compute nodes further includes:

under the condition that a plurality of the compute nodes have the same current task quantities, according to an order of a current datum processing capability of the compute nodes from higher to lower, traversing the plurality of compute nodes sequentially.

According to an embodiment of the present application, the step of, counting the current datum operation task burden of each of the other compute nodes includes:

determining a total quantity of data to be processed of all of the current datum operation tasks and a current datum processing capability of each of the other compute nodes; and based on the total quantity of data to be processed of all the current datum operation tasks and the current datum processing capability of the compute node, determining the current datum operation task burden of each of the other compute nodes.

According to a second aspect, the present application discloses a device for acquiring a datum of an artificial intelligence platform, wherein the device is applied to an artificial intelligence cluster including a master storage node and a plurality of compute nodes, and includes:

a request acquisition module, configured for acquiring a datum operation request initiated by a target node of the artificial intelligence cluster aiming at a target datum, wherein the target node is any one of the compute nodes of the artificial intelligence cluster;

a counting module, configured for counting a current datum operation task burden of each of the other compute nodes;

a traversing module, configured for, according to an order of the current datum operation task burden from lower to higher, traversing all of the other compute nodes sequentially, and in every traversal process, judging whether the compute node that is currently being traversed has already stored the target datum; and a datum transmission module, configured for, under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that the target node performs a corresponding operation to the target datum according to the datum operation request.

According to a third aspect, the present application discloses an electronic apparatus, wherein the electronic apparatus includes a processor and a memory; and by the processor, when executing a computer program stored in the memory, the method for datum acquiring of an artificial intelligence platform above-mentioned is implemented.

According to a fourth aspect, the present application discloses a non-transitory computer-readable storage medium, wherein the non-transitory computer-readable storage medium is configured for storing a computer program; and when the computer program is executed by a processor, implements the method for datum acquiring of an artificial intelligence platform above-mentioned is implemented.

It may be seen that, according to the present application, firstly acquiring a datum operation request initiated by a target node of the artificial intelligence cluster aiming at a target datum, wherein the target node is any one of the compute nodes of the artificial intelligence cluster; then counting a current datum operation task burden of each of the other compute nodes; subsequently, according to an order of the current datum operation task burden from lower to higher, traversing all of the other compute nodes sequentially, and in every traversal process, judging whether the compute node that is currently being traversed has already stored the target datum; and under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, according to the datum operation request, performing a corresponding operation on the target datum. It may be seen that, in the present application, by means of the shared storage network pre-constructed based on the remote direct datum access technology, enabling each of the nodes to be communicated with one another, which may realize datum transmission among the different nodes of the artificial intelligence cluster, the utilization rate of the network and the magnetic disk of the artificial intelligence cluster is sufficiently improved, and the burden of the network and the magnetic disk of the master storage node of the artificial intelligence cluster is reduced, and the stable operation of the services of the relevant platforms of the artificial intelligence cluster is ensured.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art may obtain other figures according to the provided figures without paying creative work.

DETAILED DESCRIPTION

The technical solutions of embodiments of the present application will be clearly and completely described below with reference to the drawings of the embodiments of the present application. Apparently, the described embodiments are merely some embodiments of the present application, rather than all of the embodiments. All of the other embodiments that a person skilled in the art obtains on the basis of the embodiments of the present application without paying creative work will fall within the protection scope of the present application.

Figure 1:
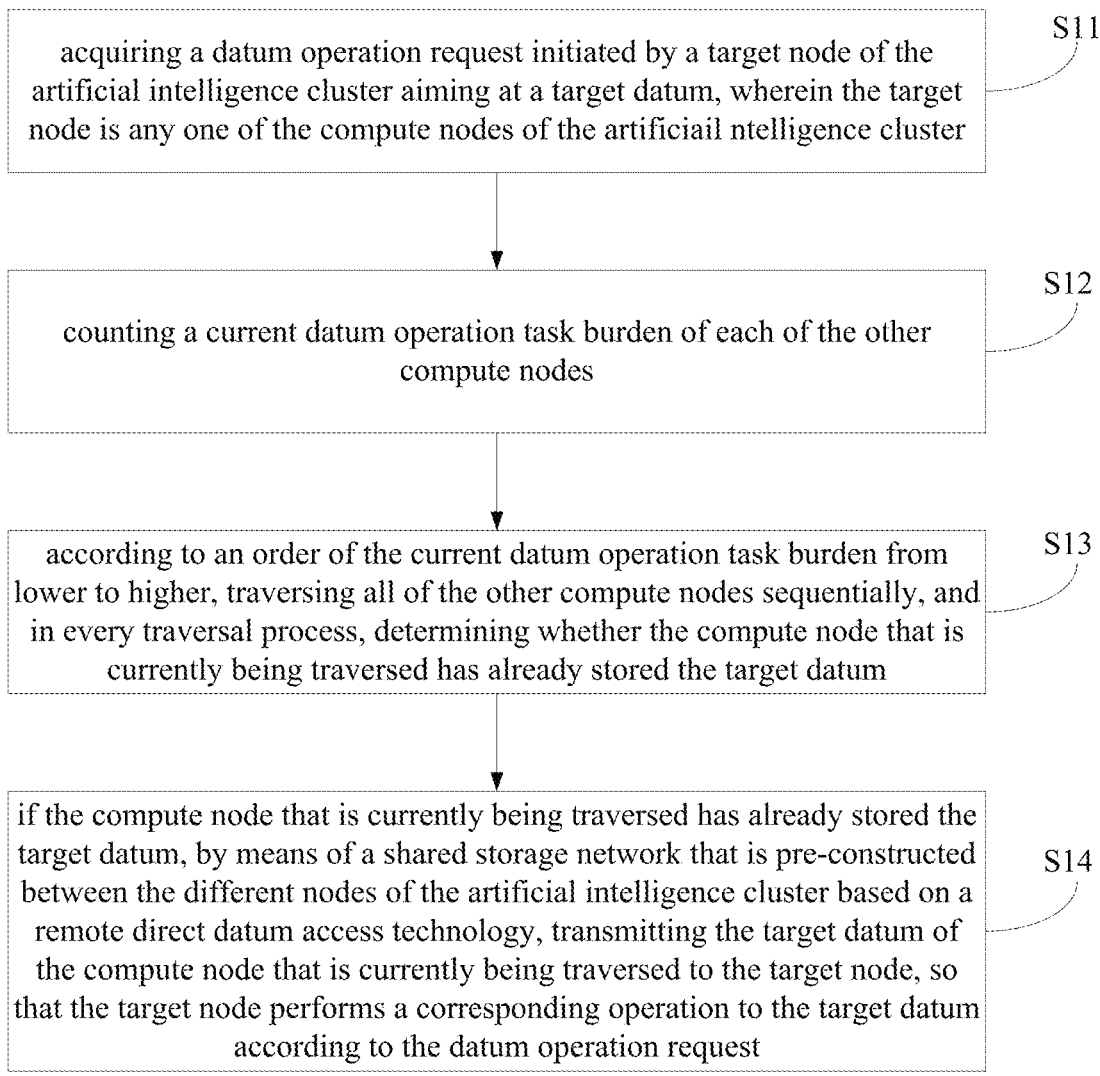
FIG. 1 is a flow chart of the method for acquiring the datum of the artificial intelligence platform according to the present application.

An embodiment of the present application discloses a method for acquiring a datum of an artificial intelligence platform. Referring to FIG. 1, the method includes:

Step S11: Acquiring a datum operation request initiated by a target node of the artificial intelligence cluster aiming at a target datum, wherein the target node is any one of the compute nodes of the artificial intelligence cluster.

In the present embodiment, the artificial intelligence cluster mainly includes a master storage node and all other nodes except the master storage node, that is, the compute nodes. Wherein, the target datum includes, but is not limited to, data for example a training script, a training model file, a training log record datum and a data set file and the like, and these data are pre-stored in the master storage node, and may also be stored in any one or more compute nodes. Meanwhile, the master storage node is an entry node of the entire artificial intelligence cluster. That is, any of the target data that are required by the compute nodes may be acquired in the master storage node.

In the present embodiment, firstly, acquiring a datum operation request initiated by a pre-specified target node of the artificial intelligence cluster aiming at the target datum. Wherein, the target node is any one of the compute nodes of the artificial intelligence cluster. The datum operation request is initiated to the target datum, and the datum operation requests corresponding to the different target data are also different. For example, when the target datum is a data set file, the corresponding datum operation request may be a transmission operation request of the data set file.

Step S12: Counting a current datum operation task burden of each of the other compute nodes.

In the present embodiment, after acquiring the datum operation request initiated by the target node of the artificial intelligence cluster aiming at the target datum, it is necessary to count the current datum operation task burden of all of the other compute nodes except the above-mentioned target node. It may be understood that, the current datum operation ask burden mainly includes, but is not limited to, the processing capacity of the compute node for the current datum operation task and the total quantity of the data required to be processed. The stronger the processing capacity of the compute node to the current datum operation task, indicates that the lower the current datum operation task burden is. The weaker the processing capacity of the compute node to the current datum operation task, indicates that the higher the current datum operation task burden is. The larger the total quantity of data required to be processed currently by the compute node, indicates that the higher the current datum operation task burden is. The smaller the total quantity of the data required to be processed currently by the compute node, indicates that the lower the current datum operation task burden is.

Figure 2:
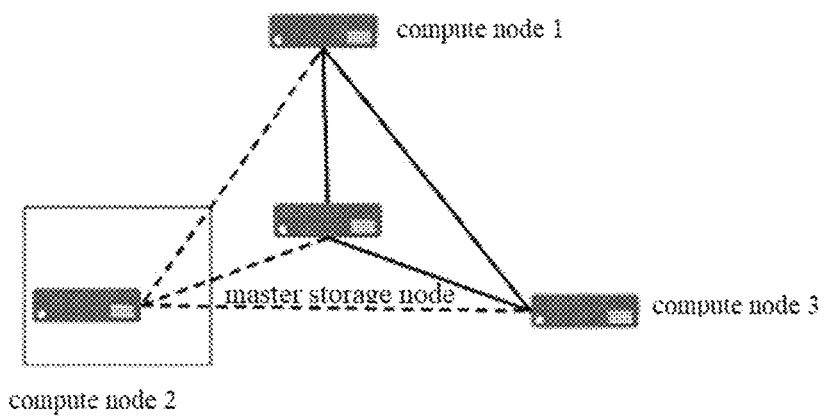
FIG. 2 is a structural schematic diagram of the shared storage network that malfunctions according to the present application.

In the present embodiment, the step of, counting the current datum operation task burden of each of the other compute nodes may include: monitoring whether any of the other compute nodes malfunctions; and under the condition that any of the other compute nodes malfunctions, setting the current datum operation task burden of the compute node that malfunctions to be infinitely great. In the process of counting the current datum operation task burden of each of the other compute nodes, under the condition it is monitored that any one of the compute nodes malfunctions, for example, damage or shutdown and offline, the current datum operation task burden of the compute node that malfunctions may be set to be infinitely great; that is, the target datum is uncapable to be quired from the compute node that malfunctions. For example, referring to FIG. 2, under the condition that a software and/or hardware failure of the compute node 2 is monitored, the current datum operation task burden of the compute node 2 is set to be infinitely great.

Step S13: According to an order of the current datum operation task burden from lower to higher, traversing all of the other compute nodes sequentially, and in every traversal process, judging whether the compute node that is currently being traversed has already stored the target datum.

In the present embodiment, after completing counting the current datum operation task burden of each of the other compute nodes, according to the arrangement sequence of the current datum operation task burden from lower to higher, it is capable to traverse sequentially from the compute node with the lowest current datum operation task burden, and in every traversal process, judging whether the datum that is the same as the target datum has already existed in the compute node that is currently being traversed.

Step S14: Under the condition the compute node that is currently being traversed has already stored the target datum, by means of a shared storage network that is pre-constructed between the different nodes of the artificial intelligence cluster based on a remote direct datum access (that is, RDMA, Remote Direct Memory Access) technology, transmitting the target datum of the compute node that is currently being traversed to the target node, so that by the target node, according to the datum operation request, performing a corresponding operation to the target datum.

In the present embodiment, according to an order of the current datum operation task burden from lower to higher, traversing all of the other compute nodes sequentially, and in every traversal process, under the condition the compute node that is traversed has already stored the datum the same as the target datum, by means of a shared storage network that is pre-constructed between the different nodes of the artificial intelligence cluster based on the remote direct datum access technology, transmitting the target datum of the compute node that is currently being traversed to the corresponding target node. After acquiring the target datum, by the target node, performing the corresponding datum operation to the target datum according to the datum operation request.

Figure 3:
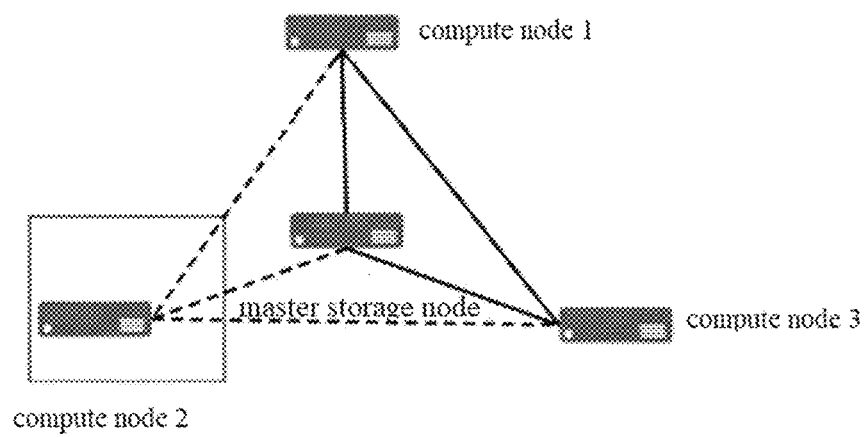
FIG. 3 is a structural schematic diagram of the shared storage network having the fully connected network structure according to the present application.

It should be noted that, in the present embodiment, the construction process of the shared storage network may include: based on the remote direct datum access technology and an infinite bandwidth technology, constructing a network file system shared storage network between the different nodes of the artificial intelligence cluster, wherein the network structure of the network file system shared storage network is a fully connected structure. In the present embodiment, to realize datum file transmission between all of the nodes of the artificial intelligence cluster, firstly, based on the remote direct datum access technology and the infinite bandwidth technology (that is, an Infiniband network), between the different nodes in the artificial intelligence cluster, constructing a Network File System (NFS) shared storage network, and the network structure of the NFS shared storage network is a fully connected structure, in which any two nodes is capable to communicate with each other. For example, referring to FIG. 3, by means of the remote direct datum access technology and the infinite bandwidth technology, a fully connected network is capable to be realized in which any two nodes among the master storage node, the compute node 1, the compute node 2 and the compute node 3 are interconnected and accessible.

It may be understood that, after constructing the network file system shared storage network, by means of the shared storage network, the designated target node is capable to realize communication and mutual access with all of the other compute nodes in the artificial intelligence cluster, so that, in the process of acquiring the target datum, the datum the same as the target datum is capable to be quired by means of all of the other compute nodes, and the quired datum is capable to be sent to the target node. Further, referring to FIG. 2, under the condition that a software and/or hardware failure of the compute node 2 is monitored, by means of the shared storage network of the fully connected structure, it may be quired from the compute node 1 and the compute node 3 whether the compute node 1 and the compute node 3 contain the datum the same as the target datum.

It may be seen that, according to the embodiments of the present application, firstly, acquiring a datum operation request initiated by a target node of the artificial intelligence cluster aiming at a target datum, wherein the target node is any one of the compute nodes of the artificial intelligence cluster; counting a current datum operation task burden of each of the other compute nodes thereafter; subsequently, according to an order of the current datum operation task burden from lower to higher, traversing all of the other compute nodes sequentially, and in every traversal process, judging whether the compute node that is currently being traversed has already stored the target datum; and under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, performing a corresponding operation to the target datum according to the datum operating request. It may be seen that, the present application, by means of the shared storage network pre-constructed based on the remote direct datum access technology, enables the nodes to be communicated with one another, which is capable to realize the datum transmission among the different nodes of the artificial intelligence cluster, network resources among the other nodes except the master storage node is efficiently utilized, and the burden of the network and the magnetic disk of the master storage of the artificial intelligence cluster is reduced, and so that the stable operation of services of relevant platforms of the artificial intelligence cluster is ensured.

Figure 4:
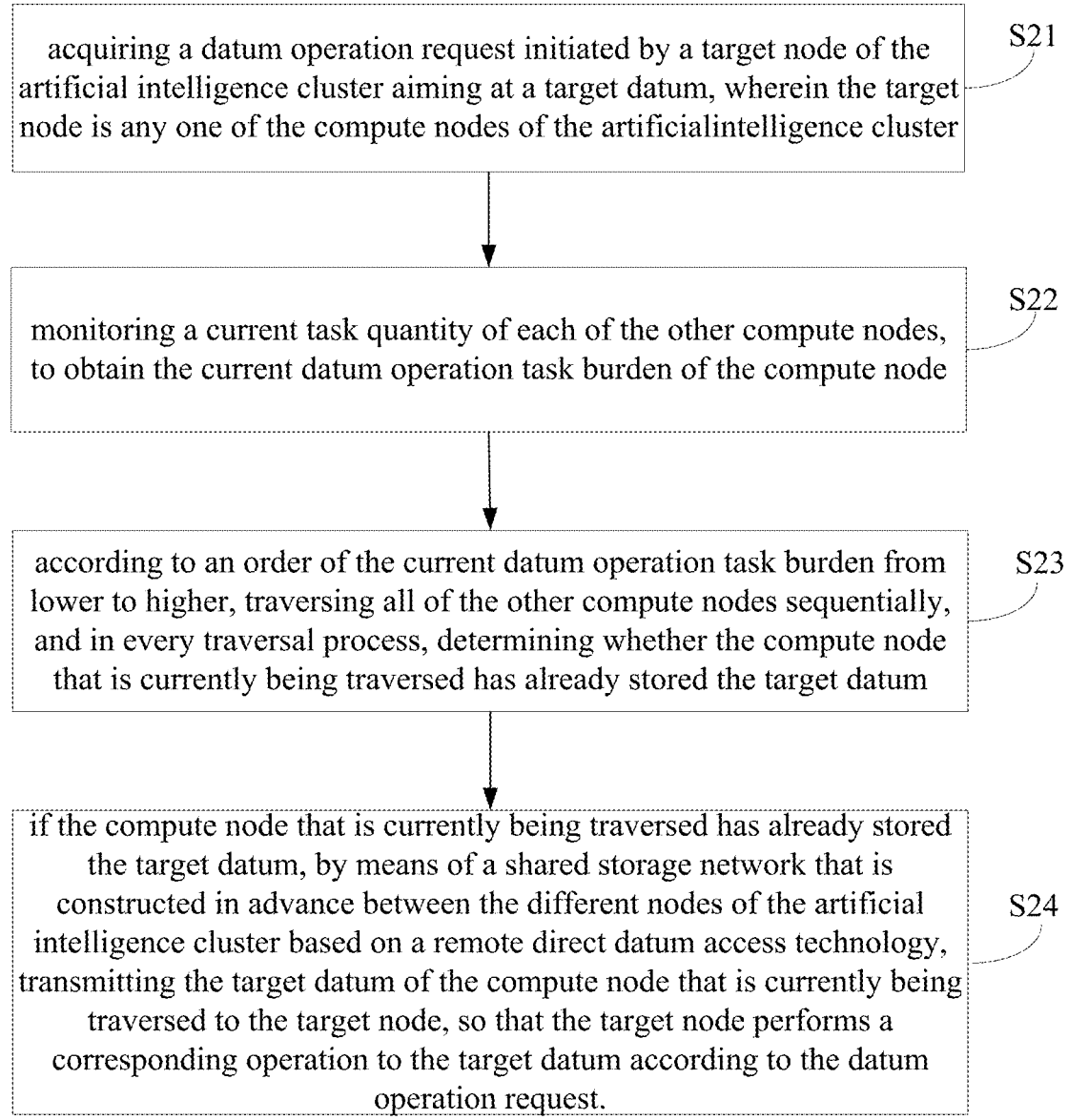
FIG. 4 is a flow chart of the method for acquiring the datum of the artificial intelligence platform according to the present application.

An embodiment of the present application discloses a method for acquiring a datum of an artificial intelligence platform. Referring to FIG. 4, the method includes:

Step S21: Acquiring a datum operation request initiated by a target node of the artificial intelligence cluster aiming at a target datum, wherein the target node is any one of the compute nodes of the artificial intelligence cluster.

Step S22: Monitoring a current task quantity of each of the other compute nodes, to obtain the current datum operation task burden of the compute node.

Figure 5:
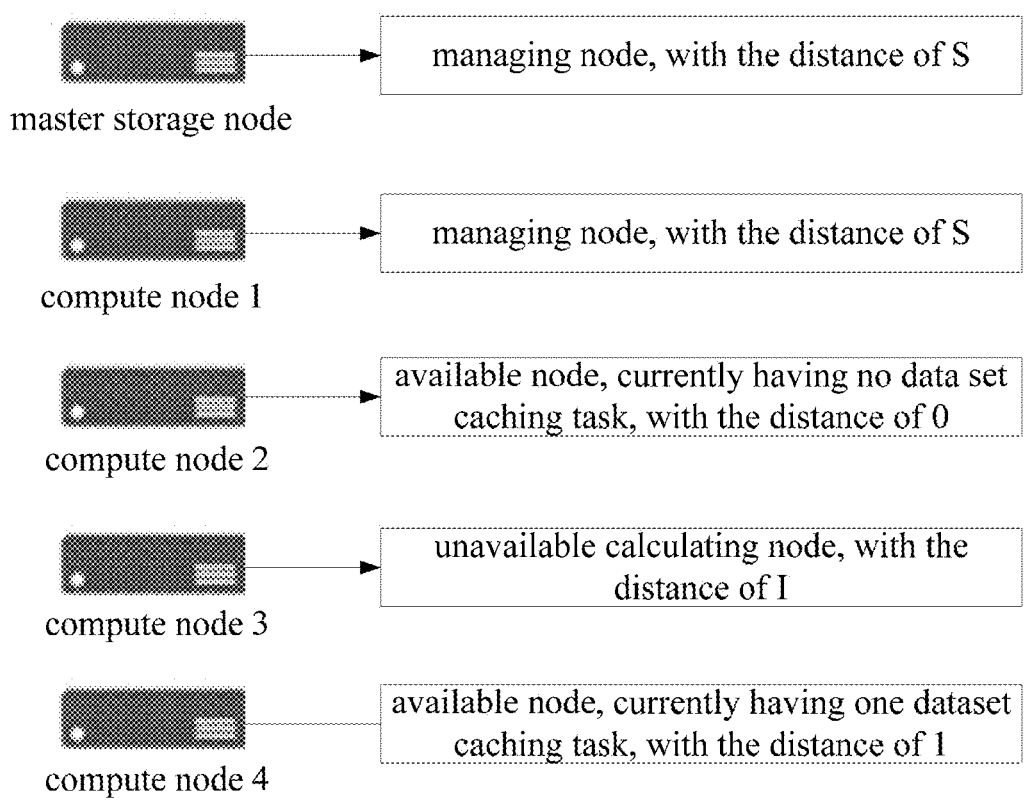
FIG. 5 is a schematic diagram of a representation of the datum operation task burden according to the present application.

In the present embodiment, after acquiring the datum operation request initiated by the target node of the artificial intelligence cluster to the target datum, each of the other compute nodes may be monitored, subsequently, counting the current task quantity of each of the compute nodes in real time thereafter, and the current task quantity is regarded as the current datum operation task burden corresponding to the compute node. Wherein, the current task includes, but is not limited to, operations for example the caching of a data set, the reading of a data set and the write-back of a training task log and the like. In the present embodiment, in the process of monitoring the current task quantity of each of the other compute nodes, the monitored current task quantity may be regarded as the transmission distance of the target datum corresponding to each of the compute nodes, wherein the smaller the value of the distance above-mentioned, indicates that the lower the current datum operation task burden of the corresponding compute node is, and the larger the value of the distance above-mentioned, indicates that the higher the current datum operation task burden of the corresponding compute node is. For example, after acquiring a cache operation request initiated by the target node of the artificial intelligence cluster aiming at the target datum, firstly, it is necessary to monitor the nodes of the artificial intelligence cluster except the target node. Referring to FIG. 5, under the condition it is monitored that the compute node 1 currently does not have a data set cache task, indicates that the compute node 1 is an available node, and the distance corresponding to the current datum operation task burden corresponding to the compute node 1 is set to be 0. Under the condition it is monitored that the compute node 2 currently has two data set cache tasks, indicates that the compute node 2 is an available node, and the distance corresponding to the current datum operation task burden corresponding to the compute node 2 is set to be 2. Under the condition it is monitored that the compute node 3 malfunctions, indicates that the compute node 3 is unavailable, and the distance corresponding to the current datum operation task burden corresponding to the compute node 3 is set to be I, wherein I is infinitely great; that is, the target datum is uncapable to be acquired from the compute node 3. Under the condition it is monitored that the compute node 4 currently has one data set cache task, indicates that the compute node 4 is an available node, and the distance corresponding to the current datum operation task burden corresponding to the compute node 4 is set to be 1. In addition, regarding the master storage node serving as the management node, the distance corresponding to it may be set to be S. It may be understood that, the particular value of the distance S corresponding to the master storage node set above-mentioned is required to ensure that, when none of the other compute nodes has the target datum, the master storage node may be regarded as the node that finally transmits the target datum stored its internally to the target node.

Step S23: According to an order of the current datum operation task burden from lower to higher, traversing all of the other compute nodes sequentially, and in every traversal process, judging whether the compute node that is currently being traversed has already stored the target datum.

In the present embodiment, after monitoring the current task quantity of each of the other compute nodes, and obtaining the current datum operation task burden of the compute node, this step may include, according to an order of the current datum operation task burden from lower to higher, traversing all of the other compute nodes sequentially, and in every traversal process, judging whether the compute node that is currently being traversed has already stored the datum the same as the target datum. For example, as shown in FIG. 5, according to the order of cache operation task burden of the current data set from lower to higher, the compute node 1, the compute node 4 and the compute node 2 are sequentially traversed, and in every traversal process, it is judged whether the compute node that is currently being traversed has already stored the target datum.

In addition, it should be further noted that, in the process of, according to the order of the current datum operation task burden from lower to higher, traversing all of the other compute nodes sequentially may further include: under the condition that a plurality of the compute nodes have the same current task quantities, according to an order of the current datum processing capability from higher to lower, traversing the plurality of compute nodes sequentially. It may be understood that, in the process of traversing, under the condition that a plurality of the compute nodes with the same current task quantities, the plurality of compute nodes may be sequentially traversed according to the order of the current datum processing capability from higher to lower. Wherein, the datum processing capacity includes, but is not limited to, the factors for example the storage resource of the compute node, the network resource and the performance of itself. For example, when the current task quantities corresponding to two compute nodes are both 3, thereby the current datum processing capabilities of the two compute nodes may be compared, and under the condition that one of the compute nodes has a higher idle storage resource and/or Central Processing Unit (CPU) processing performance, thereby that compute node is traversed preferentially.

Step S24: Under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, according to the datum operation request, performing a corresponding operation to the target datum.

Wherein, the more particular processing procedures of the steps S21 and S24, may refer to the corresponding content disclosed in the above-mentioned embodiments, and will not be discussed further herein.

It may be seen that, according to the embodiment of the present application, by monitoring the current task quantity of each of the other compute nodes, the current datum operation task burden of the compute node is obtained, and, under the condition that a plurality of compute nodes have the same current task quantities, according to an order of the current datum processing capability of the compute nodes from higher to lower, traversing the plurality of compute nodes that have the same current task quantities sequentially, and by means of comparing the magnitudes of the current datum processing capabilities, the selection of the traversal sequence of the compute nodes is further optimized, which may enable the network resources among each of the compute nodes to be sufficiently utilized, the utilization rate of the resources of the artificial intelligence cluster is enhanced, and increase the utilization efficiency of the overall compute resource of the artificial intelligence cluster is improved, so that enabling the burdens to be balanced.

Figure 6:
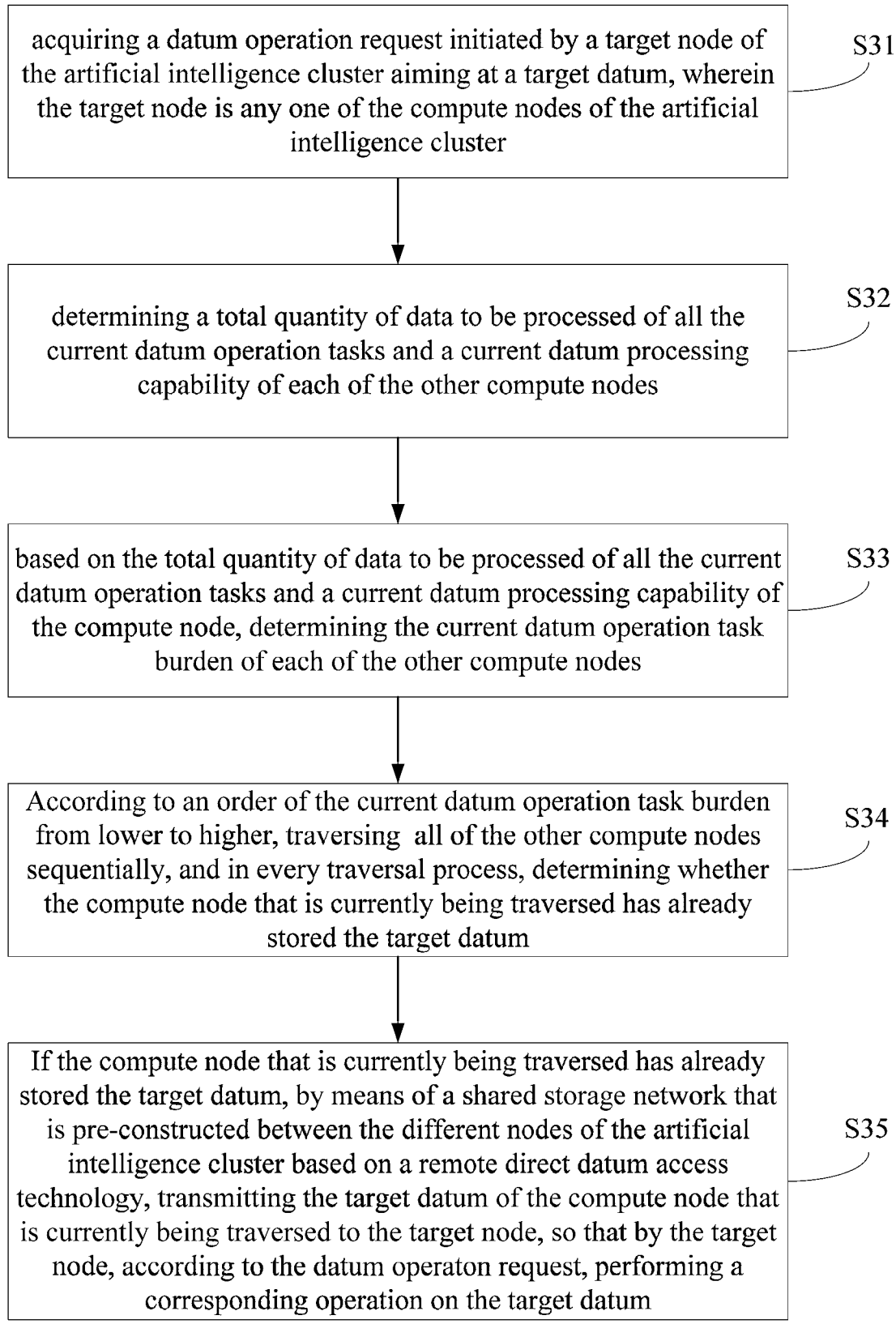
FIG. 6 is a flow chart of the method for acquiring the datum of the artificial intelligence platform according to the present application.

An embodiment of the present application discloses a method for acquiring a datum of an artificial intelligence platform. Referring to FIG. 6, the method includes:

Step S31: Acquiring a datum operation request initiated by a target node of the artificial intelligence cluster aiming at a target datum, wherein the target node is any one of the compute nodes of the artificial intelligence cluster.

Step S32: Determining a total quantity of data to be processed of all the current datum operation tasks and a current datum processing capability of each of the other compute nodes.

In the present embodiment, after acquiring the datum operation request initiated by the target node of the artificial intelligence cluster to the target datum, the total quantity of data to be processed of all of the current datum operation tasks and the current datum processing capability of each of the other compute nodes may be counted, so that the total quantity of data to be processed of all the current datum operation tasks and the current datum processing capability of each of the other compute nodes is determined. Wherein, the total quantity of data to be processed refers to the sum of data volumes corresponding to the quantity of all of the current to be processed tasks of the compute node.

Step S33: Based on the total quantity of data to be processed of all the current datum operation tasks and the current datum processing capability of the compute node, determining the current datum operation task burden of each of the other compute nodes.

In the present embodiment, after determining the total quantity of data to be processed of all the current datum operation tasks and the current datum processing capability of each of the other compute nodes, this step may include, according to the total quantity of data to be processed of all the current datum operation tasks and the current datum processing capability of the compute node, determining the burden value corresponding to the current datum operation task burden of each of the other compute nodes. For example, of the compute node, the smaller the total quantity of data to be processed of all the current datum operation tasks, and the stronger the current datum processing capability, indicates that the lower the current datum operation task burden of the compute node is.

Step S34: According to an order of the current datum operation task burden from lower to higher, traversing all of the other compute nodes sequentially, and in every traversal process, judging whether the compute node that is currently being traversed has already stored the target datum.

Step S35: Under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, according to the datum operation request, performing a corresponding operation on the target datum.

Wherein, the more particular processing procedures of the steps S31, S34 and S35 may refer to the corresponding content disclosed in the above-mentioned embodiments, and will not be discussed further herein.

It may be seen that, according to the embodiments of the present application, firstly, determining a total quantity of data to be processed of all the current datum operation tasks and a current datum processing capability of each of the other compute nodes; and based on the total quantity of data to be processed of all the current datum operation tasks and the current datum processing capability of the compute node, determining the current datum operation task burden of each of the other compute nodes. According to the embodiment of the present application, based on the total quantity of data to be processed of all the current datum operation tasks of the compute node, and in combination with the current datum processing capability, determining the current datum operation task burden of each of the other compute nodes, so that network resources and storage resources among the nodes may be sufficiently utilized, the performance and the speed are improved, the method is very suitable for a service scene with massive files of an artificial intelligence cluster, the utilization rate of the resources of the artificial intelligence cluster is improved, the model training efficiency is improved, and the utilization efficiency of the overall compute resource of the artificial intelligence cluster is also improved.

Figure 7:
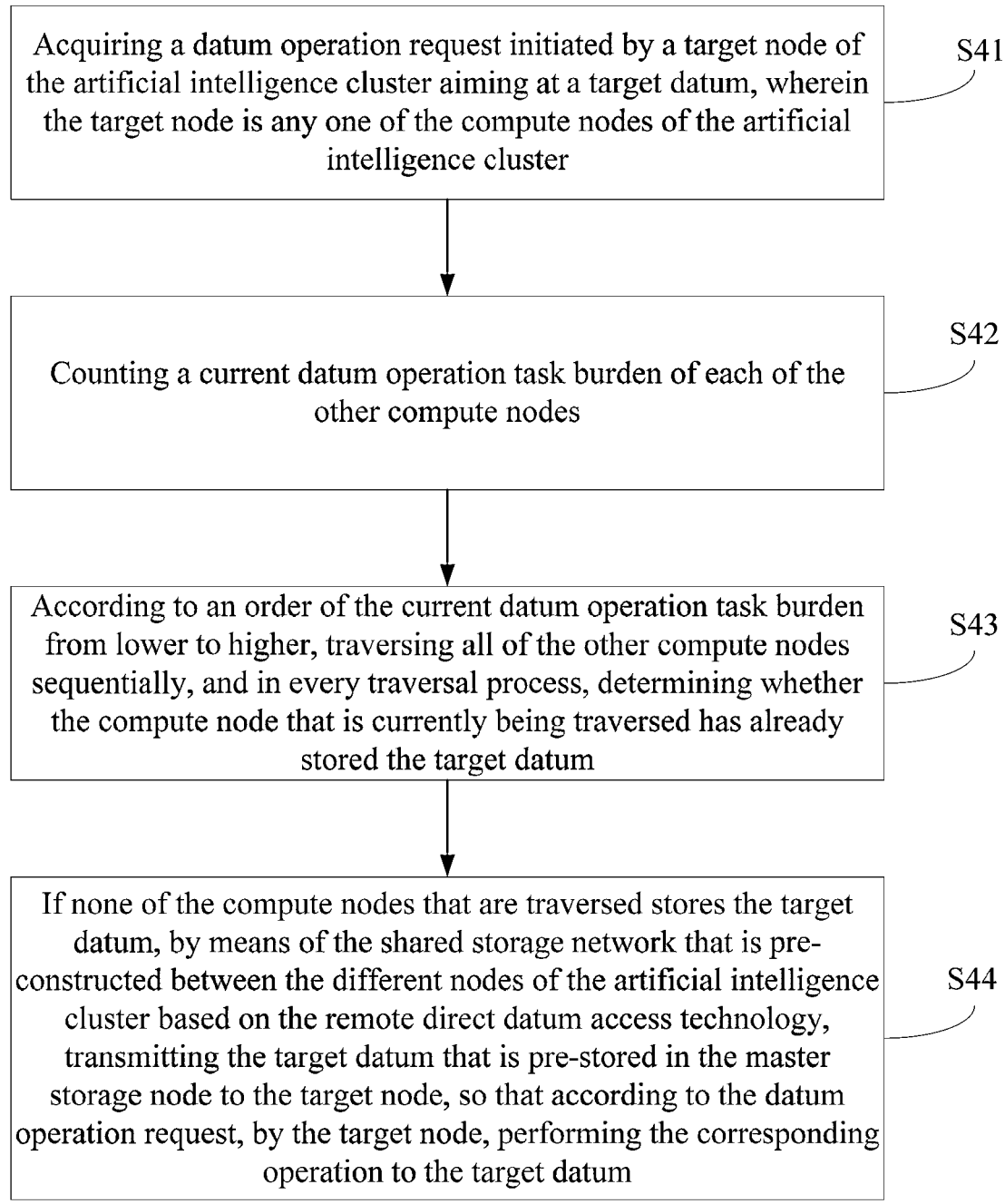
FIG. 7 is a flow chart of the method for acquiring the datum of the artificial intelligence platform according to the present application.

An embodiment of the present application discloses a method for acquiring a datum of an artificial intelligence platform. Referring to FIG. 7, the method includes:

Step S41: Acquiring a datum operation request initiated by a target node of the artificial intelligence cluster aiming at a target datum, wherein the target node is any one of the compute nodes of the artificial intelligence cluster.

Step S42: Counting a current datum operation task burden of each of the other compute nodes.

Step S43: According to an order of the current datum operation task burden from lower to higher, traversing all of the other compute nodes sequentially, and in every traversal process, judging whether the compute node that is currently being traversed has already stored the target datum.

Step S44: Under the condition none of the compute nodes that are traversed store the target datum, by means of the shared storage network that is pre-constructed between the different nodes of the artificial intelligence cluster based on the remote direct datum access technology, transmitting the target datum that is pre-stored in the master storage node to the target node, so that according to the datum operation request, by the target node, performing the corresponding operation on the target datum In the present embodiment, in the process of traversing all of the other compute nodes sequentially, under the condition none of the compute nodes that are traversed store the datum the same as the target datum, by means of a shared storage network that is pre-constructed between the different nodes of the artificial intelligence cluster based on the remote direct datum access technology, transmitting the target datum that is pre-stored in the master storage node to the target node; that is, the master storage node is the node that is finally used to acquire the target datum. By the target node, after acquiring the target datum above-mentioned, may perform the corresponding datum operation on the target datum according to the datum operation request.

In addition, it should be noted that, in the present embodiment, it is necessary to ensure that the master storage node of the artificial intelligence cluster does not have abnormality and pre-stores the datum corresponding to the target datum, thereby ensuring that the entire artificial intelligence cluster is the fully connected network structure.

Wherein, the more particular processing procedures of the steps S41, S42 and S43 may refer to the corresponding content disclosed in the above-mentioned embodiments, and will not be discussed further herein.

It may be seen that, according to the embodiments of the present application, under the condition none of the compute nodes that are traversed store the target datum, by means of the shared storage network that is pre-constructed between the different nodes of the artificial intelligence cluster based on the remote direct datum access technology, transmitting the target datum that is pre-stored in the master storage node to the target node, to ensure that, under the condition that the compute nodes do not have the target datum, by means of the master storage node, acquiring the target datum.

Figure 8:
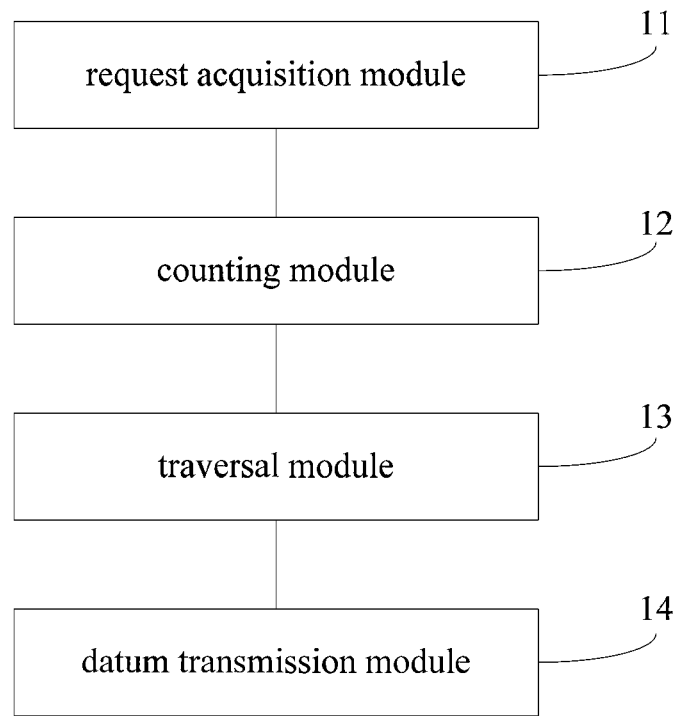
FIG. 8 is a structural schematic diagram of the device for acquiring the datum of the artificial intelligence platform according to the present application.

Correspondingly, an embodiment of the present application further discloses a device for acquiring a datum of an artificial intelligence platform, wherein the device is applied to an artificial intelligence cluster comprising a master storage node and a plurality of compute nodes. Referring to FIG. 8, the device includes:

- a request acquisition module 11, configured for acquiring a datum operation request initiated by a target node of the artificial intelligence cluster aiming at a target datum, wherein the target node is any one of the compute nodes of the artificial intelligence cluster;
- a counting module 12, configured for counting a current datum operation task burden of each of the other compute nodes;
- a traversal module 13, configured for, according to an order of the current datum operation task burden from lower to higher, traversing all of the other compute nodes sequentially, and in every traversal process, judging whether the compute node that is currently being traversed has already stored the target datum; and
- a datum transmission module 14, configured for, under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that the target node performs a corresponding operation to the target datum according to the datum operation request.

Wherein, the workflow of the modules may refer to the corresponding content disclosed in the above-mentioned embodiments, and will not be discussed further herein.

It may be seen that, according to the embodiments of the present application, firstly, acquiring a datum operation request initiated by a target node of the artificial intelligence cluster to a target datum, wherein the target node is any one of the compute nodes of the artificial intelligence cluster; counting a current datum operation task burden of each of the other compute nodes thereafter; subsequently, according to an order of the current datum operation task burden from lower to higher, traversing all of the other compute nodes sequentially, and in every traversal process, judging whether the compute node that is currently being traversed has already stored the target datum; and under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that the target node performs a corresponding operation to the target datum according to the datum operation request. It may be seen that, according to the present application, by means of the shared storage network constructed based on the remote direct datum access technology, enables the nodes to be communicated with one another, so that the mutual datum transmission among the different nodes of the artificial intelligence cluster may be realized, the utilization rate of networks and magnetic disks of the artificial intelligence cluster is sufficiently improved, and at the same time, the burden of network and storage of the master storage of the artificial intelligence cluster are reduced, so that the stable operation of services of relevant platforms of the artificial intelligence cluster is ensured.

According to some embodiments, the device for acquiring a datum of an artificial intelligence platform may further include:
- a first datum transmission unit configured for, under the condition none of the compute nodes that are traversed stores the target datum, by means of the shared storage network that is pre-constructed between the different nodes of the artificial intelligence cluster based on the remote direct datum access technology, transmitting the target datum that is pre-stored in the master storage node to the target node, so that according to the datum operation request, by the target node, performing the corresponding operation to the target datum.

According to some embodiments, a constructed process of the shared storage network may include:
- a network construction unit, configured for, based on the remote direct datum access technology and an infinite-bandwidth technique, constructing a network file system shared storage network between the different nodes of the artificial intelligence cluster, wherein the network structure of the network file system shared storage network is a fully connected structure.

According to some embodiments, the counting module 12 may include:
- a first monitoring unit, configured for monitoring whether any of the other compute nodes malfunctions; and
- a setting unit, configured for, under the condition that any of the other compute nodes malfunctions, setting the current datum operation task burden of the compute node that malfunctions to be infinitely great.

According to some embodiments, the counting module 12 may include:
- a second monitoring unit, configured for monitoring a current task quantity of each of the other compute nodes, to obtain the current datum operation task burden of the compute node.

According to some embodiments, the traversal module 13 may further include:
- a first traversal unit configured for, under the condition that a plurality of the compute nodes have the same current task quantities, according to an order of a current datum processing capability of the compute nodes from higher to lower, traversing the plurality of compute nodes sequentially.

According to some embodiments, the counting module 12 may include:
- a first determination unit, configured for determining a total quantity of data to be processed of all the current datum operation tasks and a current datum processing capability of each of the other compute nodes; and
- a second determination unit, configured for, based on the total quantity of data to be processed of all the current datum operation tasks and the current datum processing capability of the compute node, determining the current datum operation task burden of each of the other compute nodes.

Figure 9:
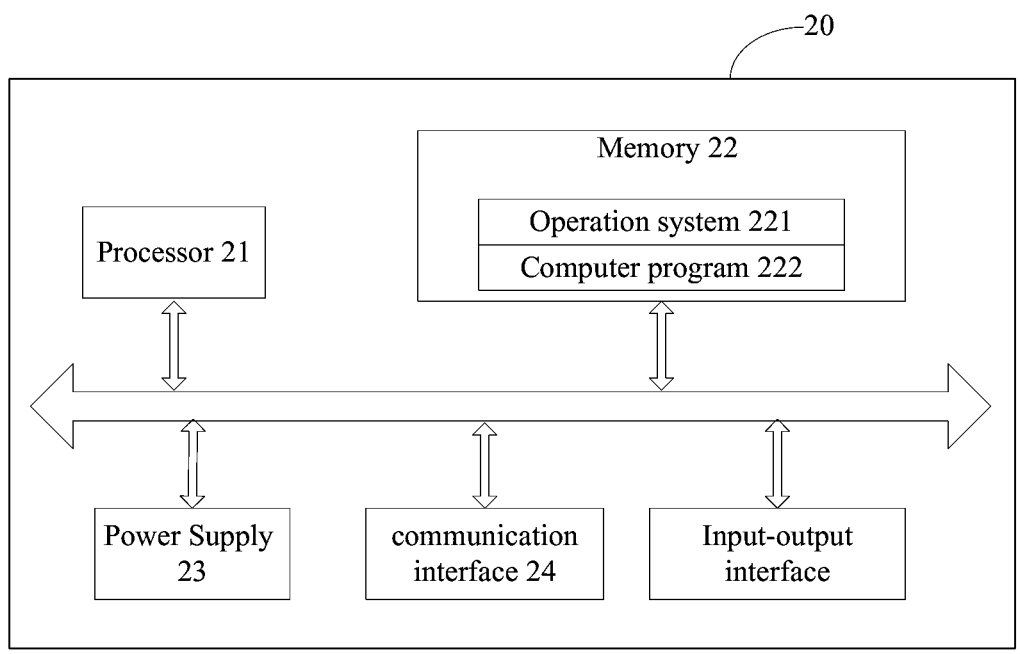
FIG. 9 is a structural diagram of the electronic apparatus according to the present application.

Further, an embodiment of the present application further discloses an electronic apparatus. FIG. 9 is a structural schematic diagram of the electronic apparatus 20 according to an illustrative embodiment of the present application, and the content of the figure should not be deemed as any limitation on the scope of application of the present application.

FIG. 9 is a structural schematic diagram of the electronic apparatus 20 according to an embodiment of the present application. The electronic apparatus 20 may include: at least one processor 21, at least one memory 22, a power supply 23, a communication interface 24, an input/output interface 25 and a communication bus 26. Wherein, the memory 22 is configured for storing a computer program, and the computer program is loaded and executed by the processor 21, to implement the relevant steps of the method for datum acquiring of an artificial intelligence platform according to any one of the above-mentioned embodiments. In addition, the electronic apparatus 20 according to the present embodiment may be an electronic computer.

In the present embodiment, the power supply 23 is configured for supplying an operation voltage to each of hardware devices of the electronic apparatus 20. The communication interface 24 is capable to create a datum transmission channel between the electronic apparatus 20 and an external device, and the communication protocol it follows is any communication protocol that is capable to be applied to the technical solutions of the present application, and it is not limited herein. The input/output interface 25 is configured for acquiring data inputted from the external or outputting data to the external, and its particular interface type may be selected according to particular application requirements, and is not limited herein.

In addition, the memory 22, as the carrier for the resource storage, may be a read-only memory, a random access memory, a magnetic disk, an optical disk and so on, the resource stored thereon may include an operation system 221, a computer program 222 and the like, and the storage mode may be short-term storage or permanent storage.

Wherein, the operation system 221 is configured for managing and controlling hardware devices of the electronic apparatus 20 and the computer program 222, and it may be Windows Server, Netware, Unix, Linux and the like. The computer program 222, besides including the computer program that is capable to be configured for completing the method for datum acquiring of an artificial intelligence platform executed by the electronic apparatus 20 disclosed in any one of the above-mentioned embodiments, may further include computer programs that is capable to be configured for completing other operations.

Further, the present application further discloses a non-transitory computer-readable storage medium, wherein the non-transitory computer-readable storage medium is configured for storing a computer program; and the computer program, when executed by a processor, the method for datum acquiring of an artificial intelligence platform stated above-mentioned is implemented. The steps of the method may refer to the corresponding content disclosed in the above-mentioned embodiments, and will not be discussed further herein.

Each of the embodiments of the description are described in the mode of progression, each of the embodiments emphatically describes the differences from the other embodiments, and the same or similar parts of each of the embodiments may be referred to each other. For the device disclosed in the embodiments, since it corresponds to the method disclosed in the embodiments, it is described simply, and the relevant portions may refer to the description of the method.

A person skilled in the art may further understand that, the units and the algorithm steps of each of the examples described with reference to the embodiments disclosed herein may be implemented by means of electronic hardware, computer software or a combination thereof. In order to clearly illustrate the interchangeability between the hardware and the software, the above-mentioned description has described generally the compositions and the steps of each of the examples according to the functions. Whether these functions are executed by hardware or software depends on the particular applications and the design constraints of the technical solutions. A person skilled in the art may use different methods to implement the described functions with respect to each of the particular applications, but the implementations should not be considered as extending beyond the scope of the present application.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a non-transitory storage medium in any other form well known in the art.

Finally, it should also be noted that, in the present application, relation terms for example first and second are merely intended to distinguish one entity or operation from another entity or operation, and that does not necessarily require or imply that these entities or operations have therebetween any such actual relation or order. Furthermore, the terms "include", "comprise" or any variants thereof are intended to cover non-exclusive inclusions, so that processes, methods, articles or devices that include a series of elements do not merely include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The method for datum acquiring of an artificial intelligence platform, the device, the apparatus and the medium according to the present application have been described in details above. The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be understood as limiting the present application.

The invention claimed is:

1. A method for acquiring a datum of an artificial intelligence platform, wherein the method is applied to an artificial intelligence cluster comprising a master storage node and a plurality of compute nodes, and comprises:
    acquiring a datum operation request initiated by a target node of the artificial intelligence cluster aiming at a target datum, wherein the target node is any one of the compute nodes of the artificial intelligence cluster;
    counting a current datum operation task burden of each of the other compute nodes;
    according to an order of the current datum operation task burden from lower to higher, traversing all of the other compute nodes sequentially, and in every traversal process, judging whether the compute node that is currently being traversed has already stored the target datum;
    under the condition the compute node that is currently being traversed has already stored the target datum, by means of a shared storage network that is pre-constructed between the different nodes of the artificial intelligence cluster based on a remote direct datum access technology, transmitting the target datum of the compute node that is currently being traversed to the target node, so that by the target node, according to the datum operation request, performing a corresponding operation on the target datum;
    wherein a construction process of the shared storage network comprises:
    based on the remote direct datum access technology and an infinite bandwidth technology, constructing a network file system shared storage network between the different nodes of the artificial intelligence cluster, wherein the network structure of the network file system shared storage network is a fully connected structure.

2. The method for acquiring the datum of the artificial intelligence platform according to claim 1, wherein the method further comprises:
    under the condition none of the compute nodes that are traversed store the target datum, by means of the shared storage network that is pre-constructed between the different nodes of the artificial intelligence cluster based on the remote direct datum access technology, transmitting the target datum that is pre-stored in the master storage node to the target node, so that according to the datum operation request, by the target node, performing the corresponding operation on the target datum.

3. The method for acquiring the datum of the artificial intelligence platform according to claim 1, wherein the step of, counting the current datum operation task burden of each of the other compute nodes comprises:
    monitoring whether any of the other compute nodes malfunctions; and
    under the condition that any of the other compute nodes malfunctions, setting the current datum operation task burden of the compute node that malfunctions to be infinitely great.

4. The method for acquiring the datum of the artificial intelligence platform according to claim 1, wherein the step of, counting the current datum operation task burden of each of the other compute nodes comprises:
    monitoring a current task quantity of each of the other compute nodes, to obtain the current datum operation task burden of the compute node.

5. The method for acquiring the datum of the artificial intelligence platform according to claim 4, wherein in the process of, according to the order of the current datum operation task burden from lower to higher, traversing sequentially all of the other compute nodes further comprises:

under the condition that a plurality of the compute nodes have the same current task quantities, according to an order of a current datum processing capability of the compute nodes from higher to lower, traversing the plurality of compute nodes sequentially.

6. The method for acquiring the datum of the artificial intelligence platform according to claim 1, wherein the step of, counting the current datum operation task burden of each of the other compute nodes comprises:

determining a total quantity of data to be processed of all the current datum operation tasks and a current datum processing capability of each of the other compute nodes; and based on the total quantity of data to be processed of all the current datum operation tasks and the current datum processing capability of the compute node, determining the current datum operation task burden of each of the other compute nodes.

7. The method for acquiring the datum of the artificial intelligence platform according to claim 1, wherein the target datum comprises at least one of a training script, a training model file, a training log record datum and a data set file.

8. The method for acquiring the datum of the artificial intelligence platform according to claim 1, wherein the stronger the processing capacity of the compute node to the current datum operation task, indicates that the lower the current datum operation task burden is; the weaker the processing capacity of the compute node to the current datum operation task, indicates that the higher the current datum operation task burden is; the larger the total quantity of data required to be processed currently by the compute node, indicates that the higher the current datum operation task burden is; the smaller the total quantity of the data required to be processed currently by the compute node, indicates that the lower the current datum operation task burden is.

9. The method for acquiring the datum of the artificial intelligence platform according to claim 1, wherein the datum processing capacity comprises at least one of the factors: the storage resource of the compute node, the network resource and the performance of itself.

10. An electronic apparatus, wherein the electronic apparatus comprises a processor and a memory; and by the processor, when executing a computer program stored in the memory, the method for datum acquiring of an artificial intelligence platform according to claim 1 is implemented.

11. The electronic apparatus according to claim 10, wherein the method further comprises:

under the condition none of the compute nodes that are traversed store the target datum, by means of the shared storage network that is pre-constructed between the different nodes of the artificial intelligence cluster based on the remote direct datum access technology, transmitting the target datum that is pre-stored in the master storage node to the target node, so that according to the datum operation request, by the target node, performing the corresponding operation on the target datum.

12. The electronic apparatus according to claim 10, wherein the step of, counting the current datum operation task burden of each of the other compute nodes comprises:

monitoring whether any of the other compute nodes malfunctions; and under the condition that any of the other compute nodes malfunctions, setting the current datum operation task burden of the compute node that malfunctions to be infinitely great.

13. The electronic apparatus according to claim 10, wherein the step of, counting the current datum operation task burden of each of the other compute nodes comprises:

monitoring a current task quantity of each of the other compute nodes, to obtain the current datum operation task burden of the compute node.

14. The electronic apparatus according to claim 13, wherein in the process of, according to the order of the current datum operation task burden from lower to higher, traversing sequentially all of the other compute nodes further comprises:

under the condition that a plurality of the compute nodes have the same current task quantities, according to an order of a current datum processing capability of the compute nodes from higher to lower, traversing the plurality of compute nodes sequentially.

15. The electronic apparatus according to claim 10, wherein the step of, counting the current datum operation task burden of each of the other compute nodes comprises:

determining a total quantity of data to be processed of all the current datum operation tasks and a current datum processing capability of each of the other compute nodes; and based on the total quantity of data to be processed of all the current datum operation tasks and the current datum processing capability of the compute node, determining the current datum operation task burden of each of the other compute nodes.

16. The electronic apparatus according to claim 10, wherein the target datum comprises at least one of a training script, a training model file, a training log record datum and a data set file.

17. The electronic apparatus according to claim 10, wherein the stronger the processing capacity of the compute node to the current datum operation task, indicates that the lower the current datum operation task burden is; the weaker the processing capacity of the compute node to the current datum operation task, indicates that the higher the current datum operation task burden is; the larger the total quantity of data required to be processed currently by the compute node, indicates that the higher the current datum operation task burden is; the smaller the total quantity of the data required to be processed currently by the compute node, indicates that the lower the current datum operation task burden is.

18. A non-transitory computer-readable storage medium, wherein the computer-readable storage medium is configured for storing a computer program; and when the computer program is executed by a processor, the method for datum acquiring of an artificial intelligence platform according to claim 1 is implemented.

* * * * *